(12) United States Patent
Sun et al.

(10) Patent No.: US 12,367,048 B2
(45) Date of Patent: Jul. 22, 2025

(54) METHOD FOR LOADING MULTIPLE NEURAL NETWORK MODELS AND ELECTRONIC DEVICE

(71) Applicant: HON HAI PRECISION INDUSTRY CO., LTD., New Taipei (TW)

(72) Inventors: Guo-Chin Sun, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 812 days.

(21) Appl. No.: 17/572,867

(22) Filed: Jan. 11, 2022

(65) Prior Publication Data

US 2022/0222084 A1   Jul. 14, 2022

(30) Foreign Application Priority Data

Jan. 12, 2021   (CN) .......................... 202110036325.5

(51) Int. Cl.
*G06F 9/445* (2018.01)
*G06F 9/50* (2006.01)
(Continued)

(52) U.S. Cl.
CPC ............ *G06F 9/445* (2013.01); *G06F 9/5027* (2013.01); *G06F 16/1744* (2019.01); *G06N 3/045* (2023.01); *G06N 3/082* (2013.01)

(58) Field of Classification Search
CPC .... G06F 9/445; G06F 9/5027; G06F 16/1744; G06N 3/045; G06N 3/082
(Continued)

(56) References Cited

U.S. PATENT DOCUMENTS

2018/0293057 A1* 10/2018 Sun .......................... G06N 3/08
2019/0391796 A1* 12/2019 Brady ..................... G06F 8/458

FOREIGN PATENT DOCUMENTS

CN    111797984 A    10/2020
CN    112054805 A    12/2020

OTHER PUBLICATIONS

Guo et al., "A Survey of FPGA-Based Neural Network Inference Accelerator", arXiv: 1712.08934v3 [cs.AR] Dec. 6, 2018 (Year: 2018).*

(Continued)

*Primary Examiner* — Tsu-Chang Lee
(74) *Attorney, Agent, or Firm* — ScienBiziP, P.C.

(57) ABSTRACT

A method for loading multiple neural network model includes compiling at least two neural network models and generating at least two binary model files corresponding to the at least two neural network models. One of the at least two binary model files is an original model file which is taken as the basic model, and differences between the two files are calculated and recorded using preset difference calculation method. A differences file is generated, and the basic model and the differences file are compressed using a preset compression method, to generate an input file. Such input file is input into a neural network accelerator, the input file being decompressed to obtain the basic model and the differences file. The basic model and the differences file are loaded into the neural network accelerator. An electronic device and a non-volatile storage medium performing the above-described method are also disclosed.

20 Claims, 3 Drawing Sheets

(51) Int. Cl.
*G06F 16/174* (2019.01)
*G06N 3/045* (2023.01)
*G06N 3/082* (2023.01)

(58) Field of Classification Search
USPC .......................................................... 706/15
See application file for complete search history.

(56) References Cited

OTHER PUBLICATIONS

Deng et al., "Model compression and hardware acceleration for neural networks: a comprehensive survey", Proceedings of the IEEE, vol. 108, No. 4, Apr. 2020 (Year: 2020).*

Ji et al., "Bridging the gap between neural networks and neuromorphic hardware with a neural network compiler", ASPLOS'18, Williamsburg, VA, USA, Mar. 24-28, 2018 (Year: 2018).*

Xing et al., "DNNVM: End-to-end compiler leveraging heterogeneous optimizations on FPGA-based CNN accelerators", IEEE transactions on computer-aided design of integrated circuits and systems, vol. 39, No. 10, Oct. 2020 (Year: 2020).*

Chang et al., "Compiling deep learning models for custom hardware accelerators", arXiv: 1708.00117v2 [cs.DC] Dec. 10, 2017 (Year: 2017).*

* cited by examiner

METHOD FOR LOADING MULTIPLE NEURAL NETWORK MODELS AND ELECTRONIC DEVICE

FIELD

The subject matter herein generally relates to field of artificial intelligence, in particular to multi neural network model loading method and electronic device.

BACKGROUND

Artificial intelligence needs a lot of computerized model training, but due to the characteristics of its algorithm and computing itself, the widely used traditional computing chip cannot meet these needs. Therefore, it is necessary to build a special chip for neural network algorithm, that is, a neural network accelerator. When loading the model in the neural network accelerator, existing technology compresses the volume of the neural network model to shorten the loading time, but cannot load multiple neural network models.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
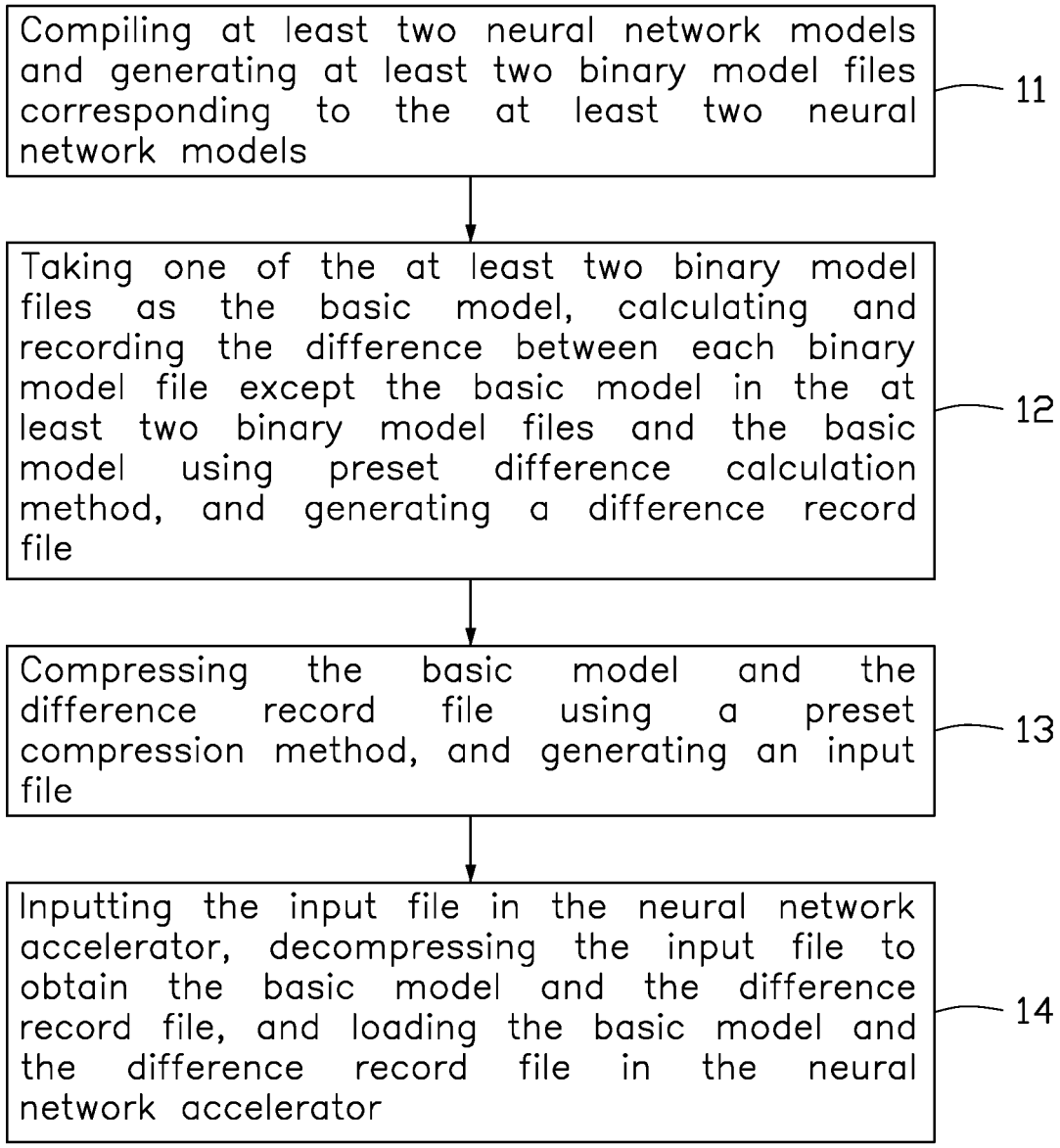
FIG. 1 is flowchart of an embodiment of a method for loading multiple neural network models according to the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

The method of the present disclosure is applied to one or more electronic devices. The electronic device is a device that can automatically perform numerical calculation and information processing according to preset or stored instructions, and its hardware includes but is not limited to microprocessor, application specific integrated circuit (ASIC), programmable gate array (FPGA), digital signal processor (DSP) embedded devices.

The electronic device can be a desktop computer, a notebook computer, a tablet computer, a cloud server, and other computing device. The electronic device can carry out human-computer interaction with the user through a keyboard, a mouse, a remote controller, a touch pad, or a voice control device.

Figure 3:
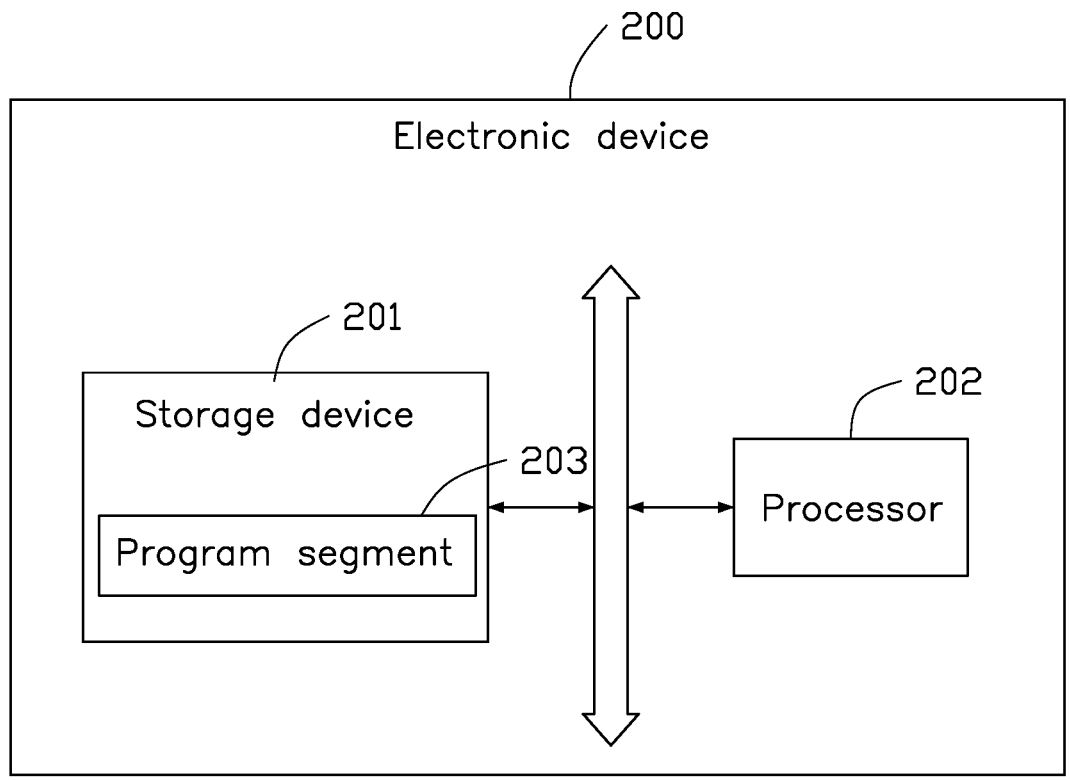
FIG. 3 is block diagram of an embodiment of an electronic device according to the present disclosure.

FIG. 1 illustrates a flow chart of one embodiment of method of the present disclosure. The method of the present disclosure can be applied to an electronic device 200 (as shown in FIG. 3).

The function for loading provided by the method of the present disclosure can be directly integrated on the electronic device 200, or run on the electronic device 200 in the form of a software development kit (SDK).

As shown in FIG. 1, the method includes the following steps:

At block 11, compiling at least two neural network models and generating at least two binary model files corresponding to the at least two neural network models.

In the embodiment, the at least two binary model files conform to the format of the neural network accelerator chip or other device.

In the embodiment, the neural network accelerator can be a central processing unit (CPU), other general-purpose processors, a digital signal processor (DSP), an application specific integrated circuits (ASIC), a field programmable gate arrays (FPGA) or other programmable logic devices discrete gates or transistor logic devices, discrete hardware components. The neural network accelerator can also be a special neural network accelerator.

At block 12, taking one of the at least two binary model files as the basic model, calculating and recording the difference between each binary model file except the basic model in the at least two binary model files and the basic model using preset difference calculation method, and generating a differences file.

In the embodiment, calculating and recording the difference between each binary model file except the basic model in the at least two binary model files and the basic model using preset difference calculation method includes: comparing each of the at least two binary model files with the basic model except the basic model in a binary format, and recording the difference between a hidden layer connection and weight of each neural network model and the hidden layer connection and weight of the basic model.

In the embodiment, the preset difference calculation method may be a difference algorithm (diff algorithm), such as bitmap algorithm.

For example, when the preset difference calculation method is bitmap algorithm, calculating and recording the difference between each binary model file using the bitmap algorithm, and generating a differences file including:

Converting each of the at least two binary model files except the base model into a readable format;

Comparing the at least two binary model files after format conversion according to the key values of the at least two binary model files; thus calculating the differences between the at least two binary model files.

At block 13, compressing the basic model and the differences file using a preset compression method, and generating an input file.

In the embodiment, compressing the basic model and the differences file using the preset compression method, and generating an input file, including:

Compressing the basic model and the differences file using a lossless coding compression method, and generating an input file.

The lossless coding compression method can be Huffman coding or arithmetic coding.

For example, when the preset compression method adopts Huffman coding, compressing the basic model and the differences file using the preset compression method, and generating an input file, including:

Reading the basic model and the differences file as an input file; counting the frequency of each preset length character segment in the input file; constructing a Huffman tree according to the frequency; constructing a compilation table for mapping characters with variable length prefixes; encoding the Huffman tree into a bit string and writing it into the output stream; encoding the file length into a bit string and writing it to the output stream; compiling each string using an encoding table and writing to the output stream; and generating the input file based on the output stream.

At block 14, inputting the input file in the neural network accelerator, decompressing the input file to obtain the basic model and the differences file, and loading the basic model and the differences file in the neural network accelerator.

In the embodiment, a plurality of neural network models are loaded into the neural network accelerator by loading the basic model and the differences file.

In this embodiment, decompressing the input file to obtain the basic model and the differences file, includes: Decompressing the input file using a decoding method corresponding to the lossless coding compression method to obtain the basic model and the differences file.

For example, when the preset compression method adopts Huffman coding, decompressing the input file using a decoding method corresponding to the lossless coding compression method to obtain the basic model and the differences file, and including:

Reading the Huffman tree; reading the text length; and decoding the input file into the basic model and the differences file according to the read Huffman tree.

In a further embodiment, the method further includes:

Modifying the parameters of the basic model according to the differences file, to switch the current basic model to the neural network model corresponding to the modified parameters in the neural network accelerator, which can specifically include:

Parsing the target model indicated in the switching instruction in response to the received switching instruction, the target model being one of the at least two neural network models other than the basic model;

Calling up the differences between the target model and the basic model in the differences file according to the switching instruction; and modifying the parameters of the basic model according to the differences to switch the current basic model to the target model at the neural network accelerator;

In the embodiment, modifying the parameters of the basic model according to the differences file includes:

Modifying the weight and/or hidden layer connection of the base model according to the differences file.

Using the above process, a plurality of neural network models can be loaded in the neural network accelerator by loading the basic model and recording differences between the basic model and other neural network models. In addition, the parameters of the basic model can be further modified according to the differences file to realize the function of quickly switching the neural network model in the neural network accelerator.

In a practical application, the neural network model can be used for target detection. In the embodiment, loading a plurality of neural network models into the neural network accelerator effectively detects different kinds of target objects in the image by switching the neural network model.

Figure 2:
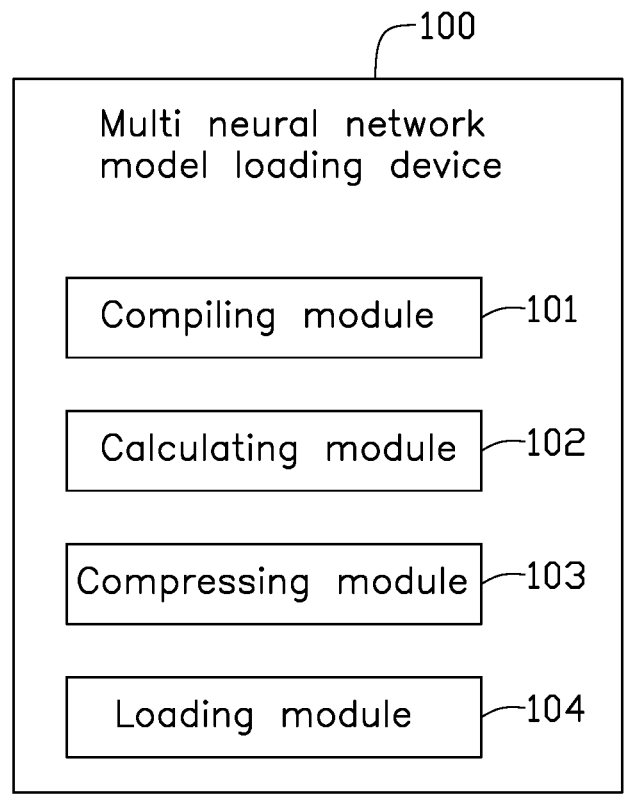
FIG. 2 is a block diagram of an embodiment of a device for loading multiple neural network models according to the present disclosure.

FIG. 2 illustrates a block diagram of one embodiment of a multi neural network model loading device 100 according to the present disclosure.

In some embodiments, the multi neural network model loading device 100 operates in an electronic device. The multi neural network model loading device 100 may include a plurality of functional modules composed of program code segments. The program code of each program segment in the multi neural network model loading device 100 can be stored in a storage device and executed by at least one processor.

In the embodiment, the multi neural network model loading device 100 can be divided into a plurality of functional modules according to the functions performed. As shown in FIG. 2, the multi neural network model loading device 100 includes a compiling module 101, a calculating module 102, a compressing module 103, and a loading module 104. The modules in the present disclosure refer to a series of computer program segments that can be executed by at least one processor and can complete fixed functions, which are stored in the storage device. In some embodiments, the functions of each module will be described in detail.

The compiling module 101 compiles at least two neural network models and generates at least two binary model files corresponding to the at least two neural network models.

In the embodiment, the at least two binary model files conform to the format of the neural network accelerator.

In the embodiment, the neural network accelerator can be a central processing unit (CPU), other general-purpose processors, a digital signal processor (DSP), an application specific integrated circuits (ASIC), a field programmable gate arrays (FPGA) or other programmable logic devices discrete gates or transistor logic devices, or discrete hardware components. The neural network accelerator can also be a special neural network accelerator.

The calculating module 102 takes one of the at least two binary model files as the basic model for reference purposes, calculates and records the differences between the binary model file and the basic model in the at least two binary model files using preset difference calculation method, and generates a differences file.

In the embodiment, the calculating module 102, in calculating and recording the differences between the binary model file and the basic model includes:

The calculating module 102 compares the files in a binary format, and records the difference between a hidden layer connection and weight of the neural network model and the hidden layer connection and weight of the basic model.

In the embodiment, the preset difference calculation method may be a difference algorithm (diff algorithm), such as bitmap algorithm.

For example, when the preset difference calculation method is bitmap algorithm, the calculating module 102 calculates and records the differences in the at least two binary model files using the bitmap algorithm, and generates a differences file, including:

The calculating module 102 converts the two files into a readable format; compares the binary model files after format conversion according to the key values of the at least two binary model files; calculates the differences between the at least two binary model files according to the above comparison.

The compressing module 103 compresses the basic model and the differences file using a preset compression method, and generates an input file.

In the embodiment, the compressing module 103 compressing the basic model and the differences file using the preset compression method, and generating an input file, includes: the compressing module 103 compressing the basic model and the differences file using a lossless coding compression method, to generate an input file.

The lossless coding compression method can be Huffman coding or arithmetic coding.

For example, when the preset compression method adopts Huffman coding, the compressing module 103 compresses the basic model and the differences file using the preset compression method, and generates an input file, including:

The compressing module 103 reads the basic model and the differences file as an input file; counts the frequency of each preset length character segment in the input file; constructs a Huffman tree according to the frequency; constructs a compilation table for mapping characters with variable length prefixes; encodes the Huffman tree into a bit string and writing it into the output stream; encodes the file length into a bit string and writing it to the output stream; compiles each string using an encoding table and writing to the output stream; and generates the input file based on the output stream.

The loading module 104 inputs the input file in the neural network accelerator, decompresses the input file to obtain the basic model and the differences file, and loads the basic model and the differences file in the neural network accelerator.

In the embodiment, a plurality of the neural network models are loaded into the neural network accelerator by loading the basic model and the differences file.

In this embodiment, the loading module 104 decompresses the input file to obtain the basic model and the differences file, includes:

The loading module 104 decompresses the input file using a decoding method corresponding to the lossless coding compression method to obtain the basic model and the differences file.

For example, when the preset compression method adopts Huffman coding, the loading module 104 decompresses the input file using a decoding method corresponding to the lossless coding compression method to obtain the basic model and the differences file, and including: reading the Huffman tree; reading the text length; and decoding the input file into the basic model and the differences file according to the read Huffman tree.

In a further embodiment, the multi neural network model loading device 100 further includes a switching module.

The multi neural network model loading device 100 modifies the parameters of the basic model according to the differences file, to switch the current basic model to the neural network model corresponding to the modified parameters in the neural network accelerator, which can specifically include:

The switching module parses the target model indicated in the switching instruction in response to the received switching instruction, and the target model is one of the compiled at least two neural network models other than the basic model;

The switching module parses the difference record between the target model and the basic model in the differences file according to the switching instruction; and modifies the parameters of the basic model according to the difference record to switch the current basic model to the target model at the neural network accelerator;

In the embodiment, the switching module modifies the parameters of the basic model according to the differences file includes:

The switching module modifies the weight and/or hidden layer connection of the base model according to the differences file.

Using the above process, a plurality of neural network models can be loaded in the neural network accelerator by loading the basic model and recording differences between the basic model and other neural network models. In addition, the parameters of the basic model can be further modified according to the differences file to realize the function of quickly switching the neural network model in the neural network accelerator.

FIG. 3 illustrate an electronic device 200 in accordance with an embodiment of the present disclosure.

The electronic device 200 can further include, but is not limited to, a storage device 201, at least one processor 202, and a program segment 203 stored in the storage device 201. The processor 202 may execute the program code of the program segment 203 to implement blocks 101-104 in method shown in FIG. 1. The processor 202 may execute the program code of the program segment 203 to implement the functions of a multi neural network model loading device 100 shown in FIG. 2.

The modules 101-104 include computer instructions or codes in form of one or more programs that may be stored in the storage device 201, and which are executed by the at least one processor 202. In other embodiment, the modules 101-104 may also be a program instruction or firmware that is embedded in the processor 202.

The one or more modules may be a series of computer program instruction segments capable of completing specific functions, and the instruction segments are used to describe the execution process of the program segment 203 in the electronic device 200.

The block diagram merely shows an example of the electronic device 200 and does not constitute a limitation to the electronic device 200. In other examples, more or less components than those illustrated may be included, or some components may be combined, or different components used. For example, the electronic device 200 may also include input and output devices, a network access devices, a bus, and the like.

The processor 202 may be a central processing unit (CPU), or may be another general purpose processor, a digital signal processor (DSP), an application specific integrated circuit (ASIC), a Field-Programmable gate array (FPGA) or other programmable logic device, a transistor logic device, or a discrete hardware component. The general purpose processor may be a microprocessor. The processor 202 may also be any conventional processor. The processor 202 is a control center of the electronic device 200. The processor 202 connects the parts of the electronic device 200 by using various interfaces and lines.

The storage device 201 can be used to store the program segment 203. The processor 203 operates or executes the program segment stored in the storage device 201 and recalls data stored in the storage device 201, and implements various functions of the electronic device 200. The storage device 201 may mainly include a storage program area and a storage data area, the storage program area may store an operating system, an application (such as sound playback and image playback) required for at least one function. The storage data area may store data created.

The storage device 201 may include a RAM, and may also include non-volatile memory such as a hard disk, a memory, a plug-in hard disk, a smart memory card (SMC), and a Secure Digital (SD) card, a flash card, at least one disk storage device, flash device, or other volatile or non-volatile solid-state storage device.

The modules and units integrated in the electronic device 200, if implemented in the form of software functional units and sold or used as separate products, may be stored in a computer readable storage medium. Based on such understanding, the present disclosure implements all or part of the processes in the foregoing embodiments, and the purposes of the disclosure may also be implemented and achieved by a computer program instructing related hardware. The computer program may be stored in a computer readable storage medium. The steps of the various method embodiments described above may be implemented by a computer program when executed by a processor. The computer program includes a computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), a random access memory (RAM), electrical carrier signals, telecommunications signals, and software distribution media. It should be noted that the content contained in the computer readable medium can be appropriately increased or decreased according to the requirements of legislation and patent practice in jurisdictions. For example, in some jurisdictions, according to legislation and patent practice, the computer readable medium does not include electric carrier signals and telecommunication signals.

In several embodiments provided by the present disclosure, it should be understood that the disclosed electronic devices and methods can be realized in other ways. For example, the electronic device described above is only schematic. For example, the division of the module is only a logical function division, and there may be another division mode in actual implementation.

Each functional module in each embodiment of the present disclosure can be integrated in the same processing module, each module can exist separately, or two or more modules can be integrated in the same module. The above integrated modules can be realized in the form of hardware or hardware plus software function modules.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for loading multi neural network model comprising:

compiling at least two neural network models and generating at least two binary model files corresponding to the at least two neural network models;

taking one of the at least two binary model files as the basic model, calculating and recording the difference between each binary model file except the basic model in the at least two binary model files and the basic model using preset difference calculation method, and generating a differences file;

compressing the basic model and the differences file using a preset compression method, and generating an input file; and inputting the input file in a neural network accelerator, decompressing the input file to obtain the basic model and the differences file, and loading the basic model and the differences file in the neural network accelerator.

2. The method according to claim 1, further comprising:
modifying parameters of the basic model according to the differences file, to switch the current basic model to the neural network model corresponding to modified parameters in the neural network accelerator.

3. The method according to claim 1, wherein the at least two binary model files conform to the format of the neural network accelerator.

4. The method according to claim 1, further comprising:
comparing each of the at least two binary model files with the basic model except the basic model in a binary format, and
recording the difference between a hidden layer connection and weight of each neural network model and the hidden layer connection and weight of the basic model.

5. The method according to claim 1, further comprising:
compressing the basic model and the differences file using a lossless coding compression method, and generating an input file.

6. The method according to claim 5, further comprising:
decompressing the input file using a decoding method corresponding to the lossless coding compression method to obtain the basic model and the differences file.

7. The method according to claim 1, further comprising:
modifying the weight and/or hidden layer connection of the base model according to the differences file.

8. An electronic device, comprising:
a storage device; and
at least one processor, wherein the storage device stores one or more programs, when executed by the at least one processor, the one or more programs cause the at least one processor to:

compile at least two neural network models and generating at least two binary model files corresponding to the at least two neural network models;

take one of the at least two binary model files as the basic model, calculate and recording the difference between each binary model file except the basic model in the at least two binary model files and the basic model using preset difference calculation method, and generating a differences file;

compress the basic model and the differences file using a preset compression method, and generating an input file; and input the input file in a neural network accelerator, decompress the input file to obtain the basic model and the differences file, and load the basic model and the differences file in the neural network accelerator.

9. The electronic device according to claim 8, wherein the at least one processor is further caused to:
modify parameters of the basic model according to the differences file, to switch the current basic model to the neural network model corresponding to modified parameters in the neural network accelerator.

10. The electronic device according to claim 8, wherein the at least two binary model files conform to the format of the neural network accelerator.

11. The electronic device according to claim 8, wherein the at least one processor is further caused to:
compare each of the at least two binary model files with the basic model except the basic model in a binary format, and
record the difference between a hidden layer connection and weight of each neural network model and the hidden layer connection and weight of the basic model.

12. The electronic device according to claim 8, wherein the at least one processor is further caused to:
compare each of the at least two binary model files with the basic model except the basic model in a binary format, and
record the difference between a hidden layer connection and weight of each neural network model and the hidden layer connection and weight of the basic model.

13. The electronic device according to claim 8, wherein the at least one processor is further caused to:
compress the basic model and the differences file using a lossless coding compression method, and generate an input file.

14. The electronic device according to claim 13, wherein the at least one processor is further caused to:
decompress the input file using a decoding method corresponding to the lossless coding compression method to obtain the basic model and the differences file.

15. The electronic device according to claim 8, wherein the at least one processor is further caused to:
modify the weight and/or hidden layer connection of the base model according to the differences file.

16. A non-transitory storage medium having stored thereon instructions that, when executed by a processor of a computer device installed in an electronic device, causes the processor to perform a loading method, wherein the method comprises:
compiling at least two neural network models and generating at least two binary model files corresponding to the at least two neural network models;
taking one of the at least two binary model files as the basic model, calculating and recording the difference between each binary model file except the basic model in the at least two binary model files and the basic model using preset difference calculation method, and generating a differences file;
compressing the basic model and the differences file using a preset compression method, and generating an input file; and
inputting the input file in a neural network accelerator, decompressing the input file to obtain the basic model and the differences file, and loading the basic model and the differences file in the neural network accelerator.

17. The non-transitory storage medium according to claim 16, further comprising:
modifying parameters of the basic model according to the differences file, to switch the current basic model to the neural network model corresponding to modified parameters in the neural network accelerator.

18. The non-transitory storage medium according to claim 16, wherein the at least two binary model files conform to the format of the neural network accelerator.

19. The non-transitory storage medium according to claim 16, further comprising:
comparing each of the at least two binary model files with the basic model except the basic model in a binary format, and
recording the difference between a hidden layer connection and weight of each neural network model and the hidden layer connection and weight of the basic model.

20. The non-transitory storage medium according to claim 16, further comprising:
compressing the basic model and the differences file using a lossless coding compression method, and generating an input file.

* * * * *